2,339,795

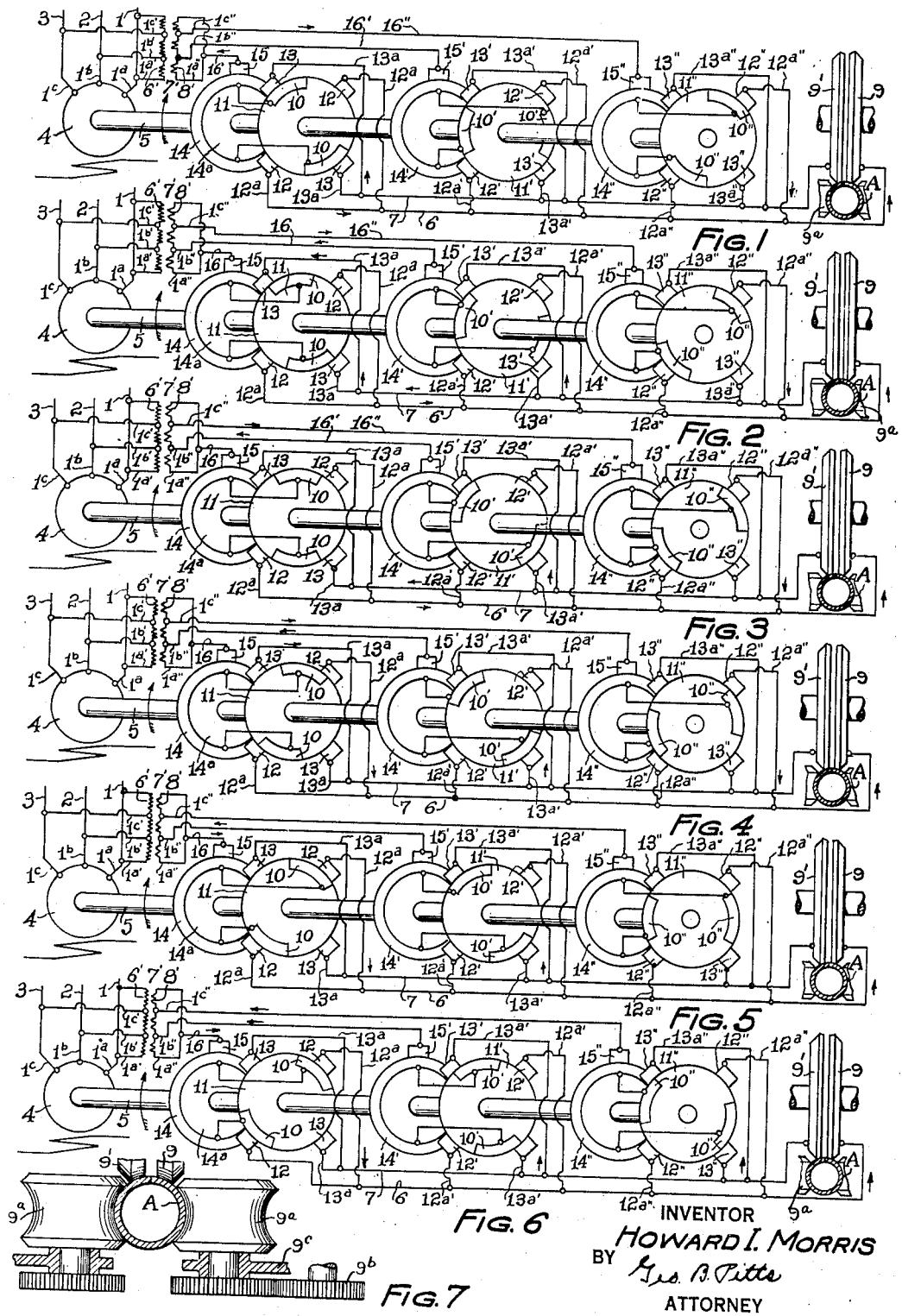
Jan. 25, 1944. H. I. MORRIS 2,339,795
WELDING APPARATUS
Filed Jan. 21, 1941
INVENTOR
HOWARD I. MORRIS
BY
ATTORNEY Patented Jan. 25, 1944

UNITED STATES PATENT OFFICE 2,339,795

WELDING APPARATUS

Howard I. Morris, Lakewood, Ohio, assignor of one-third to Carl M. Yoder and one-third to Harvey O. Yoder, both of Lakewood, Ohio Application January 21, 1941, Serial No. 375,157

7 Claims. (Cl. 219—6)

This invention relates to apparatus for and process of welding materials and preformed stock, for example, the seams of tubing.

One object of the invention is to provide an improved apparatus of this character of unitary construction wherein alternating current supplied from a suitable source is by mechanical means rectified into direct current and the latter connected to the welding electrodes for welding materials.

Another object of the invention is to provide an improved apparatus and process wherein rectified alternating current is employed for welding materials, whereby the molecular structure constituting the welded seam has a uniform texture and density throughout the length thereof.

Another object of the invention is to provide a welding apparatus supplied initially with alternating current from a power circuit and provided with means for supplying the current to the welding electrodes without affecting the balanced condition in the power circuit.

This form of construction and process have many advantages. In practically all localities only alternating current is available for commercial as well as domestic use. It therefore enables the user to not only effect welding operations with direct current, but to readily employ direct current at low voltage since the alternating current may be stepped down by means of a transformer before it is rectified. It also eliminates the installation of a direct current generator and power means for operating it. Since a direct current generator for generating a low voltage suitable for welding purposes occupies considerable space and is an expensive apparatus, my apparatus insures a large saving and is relatively small as well as of simplified construction.

Also, in practically all welding apparatus employing alternating current, only one phase of the current is used for welding and as it is customary for the power supply circuits to be of the three phase character, the use of one phase results in an unbalanced condition in the circuit. In my apparatus, the welding operations effect a pull equally on all three phases of the power circuit and thus keeps the latter evenly balanced.

Other objects of the invention will be apparent to those skilled in the art to which my invention relates from the following description taken in connection with the accompanying drawing, wherein Fig. 1 illustrates diagrammatically an apparatus embodying my invention;

Figs. 2 to 6 are views similar to Fig. 1 but showing therewith the position of the parts throughout a portion of one complete cycle of a three phase alternating current supply and Fig. 7 is an enlarged elevation of the work holding, advancing and welding elements.

In the drawing, 1, 2, 3, indicate the supply mains, of a three phase alternating current circuit connected by leads 1a, 1b, 1c, respectively, to a synchronous motor 4, which is connected to and drives a shaft 5. The shaft 5 is mounted in bearings in suitable housings or standards (not shown), the motor 4 and housings or standards being secured in position on a support (not shown). The leads 1, 2, 3, are also connected to leads 1a', 1b', 1'c, which are connected to the primary windings 6' of a transformer 7', having secondary windings 8' arranged to step the voltage impressed on the leads 1, 2, 3, down to the desired voltage for welding. The secondary windings 8 are connected by leads 1a, 1b'', 1c'' to leads 16, 16', 16'', respectively, which in turn are connected to brushes 15, 15', 15'', respectively. The brushes 15, 15', 15'' engage rings 14, 14', 14'', respectively, each mounted on and insulated from a disk fixed to the shaft 5. By means of series of contacts between each ring and direct current mains 6, 7, the leads 1a'', 1b'', 1c'', are connected to the latter mains 6, 7, in co-ordinated relation to the reversal of current flow therein, so that the current in the direct current mains is uni-directional at all times. The direct current mains 6, 7, are connected to rotatable electrodes 9, 9', respectively, and the latter in turn engage a tube A, which may be fed to the electrodes by its shaping mechanism (not shown) or other feeding means, for example, rolls 9a. The rolls 9a may be driven through suitable gearing 9b, the supports 9c for the rolls being adjustable toward and from each other to insure engagement with the tube under the desired pressure and to accommodate the rolls to tubing having different external diameters. The feeding of the tube may serve as the means for rotating the electrodes. The tube shaping mechanism or tube feeding means and the mounting for the electrodes may be of any desired form of construction for which reason such mechanism, feeding means and mounting are not shown.

I provide series of contacts for each alternating current supply main 1a'', 1b'', 1c''. The series of contacts for lead 1a'' consists of (a) a set of contacts or segments 10, which are suitably mounted in diametrical relation on a disk 11 fixed to the shaft 5 and insulated from each other and the disk, electrically connected to the ring 14, which is engaged by the brush 15 connected by lead 16 to the lead 1a'', the ring 14 being fixed to and insulated from the disk 14a which is rotated by the shaft 5; (b) a set of contacts comprising brushes 12 connected by leads 12a to the direct current main 6; and (c) a set of contacts comprising brushes 13 connected by leads 13a to the direct current main 7, the brushes of each set being diametrically related so as to be engaged by and disengaged from the segments 10 simultaneously and each brush 12 being disposed angularly 90° from the brushes 13. In the disclosure herein, for reasons which will be apparent, the length of the insulation between the segments 10 is twice the length of the latter.

The series of contacts for the lead 1b'' consists of a set of contacts (segments) 10' mounted on a disk 11' similarly to the segments 10, and electrically connected to a ring 14' which is engaged by the brush 15' connected by lead 16' to the lead 1b'', the ring 14' being fixed to and insulated from the adjacent disk 14a which is driven by the shaft 5; (b) a set of contacts comprising brushes 12' connected by leads 12a' to the direct current main 6; and a set of contacts comprising brushes 13' connected by leads 13a' to the direct current main 7, the brushes 12', 13', being mounted and spaced similarly to the brushes 12, 13, respectively.

The series of contacts for the lead 1c'' consists of (a) a set of contacts (segments) 10'' mounted on a disk similarly to the segments 10 and 10', and electrically connected to the ring 14'' which is engaged by the brush 15'' connected by lead 16'' to the lead 1c'', the ring 14'' being fixed to and insulated from the adjacent disk 14a which is rotated by the shaft 5; (b) a set of contacts comprising brushes 12'' connected by leads 12a'' to the direct current main 6; and (c) a set of contacts comprising brushes 13'' connected by leads 13a'' to the direct current main 7, the brushes 12'', 13'', being disposed similarly to the brushes 12, 13, and 12', 13', respectively.

It will be noted that the disks 11, 11', 11'', 14a, are connected to the shaft 5 so that the rings 14, 14', 14'', and the segments 10, 10', 10'', connected thereto, respectively, rotate as a unit.

Referring to Fig. 1, it will be noted (a) that the current in direct current main 7 is flowing therefrom through leads 13a, brushes 13, segments 10, ring 14 and brush 15 to lead 1a'', the circuit to direct current main 6 being open since the brushes 12 are engaging the insulation on disk 11; (b) that the alternating current in lead 1c'' is flowing therefrom through brush 15'', ring 14'', segments 10'', brushes 12'' and leads 12a'' to direct current main 6, the circuit from main 7 being open since brushes 13'' are engaging the insulation on disk 11''; and (c) that the circuit in direct current mains 6 and 7 through the brushes 12', 13' is open since the latter are engaging the insulation on the adjacent disk 11'. In Fig. 2 (a) a portion of the current in direct current main 7 is flowing therefrom through leads 13a, brushes 13, segments 10, ring 14 and brush 15 to lead 1a'', the circuit from direct current main 6 being open since brushes 12 are engaging the insulation on disk 11; (b) a portion of the current in direct current main 7 is flowing therefrom through leads 13a', brushes 13', segments 10', ring 14' and brush 15' to lead 1b'', the circuit in main 6 being open since brushes 12' are engaging the insulation on the adjacent disk 11'; and (c) current in alternating current main 1c'' is flowing therefrom through brush 15'', ring 14'', segments 10'', brushes 12'' and leads 12a'' to direct current main 6, the circuit to direct current main 7 being open since brushes 13'' are engaging the insulation on the adjacent disk 11''.

In Fig. 3, (a) current in direct current main 7 is flowing therefrom through leads 13a', brushes 13', segments 10', ring 14', brush 15' to alternating current main 1b'', the circuit to direct current main 6 being open since brushes 12' are engaging the insulation on the adjacent disk 11'; (b) current in alternating current main 1c'' is flowing therefrom through brush 15'', ring 14'', segments 10'', brushes 12'' and leads 12a'' to direct current main 6, the circuit in direct current main 7 being open since brushes 13'' are engaging the insulation on the adjacent disk 11''; and (c) the circuit in direct current mains 6, 7, is open through brushes 12, 13, since the latter are engaging the insulation on the adjacent disk 11.

In Fig. 4, (a) a portion of the current in alternating current main 1a'' is flowing therefrom through brush 15, ring 14, segments 10, brushes 12 and leads 12a to direct current main 6, the circuit from direct current main 7 being open since brushes 13 are engaging the insulation on the adjacent disk 11; (b) a portion of the current in alternating current main 1c'' is flowing therefrom through brush 15'', ring 14'', segments 10'', brushes 12'' and leads 12a'' to direct current main 6, the circuit from direct current main 7 being open since the brushes 13'' are engaging the insulation on the adjacent disk 11''; and (c) current in direct current main 7 is flowing therefrom through leads 13a', brushes 13', segments 10', ring 14', and brush 15' to alternating current main 1b'', the circuit to direct current main 6 being open since brushes 12' are engaging the insulation on the adjacent disk 11'.

In Fig. 5, (a) current in alternating current main 1a'' is flowing therefrom through brush 15, ring 14, segments 10, brushes 12 and leads 12a to direct current main 6, the circuit from direct current main 7 being open since brushes 13 are engaging the insulation on the adjacent disk 11; (b) current in direct current main 7 is flowing therefrom through leads 13a', brushes 13', segments 10', ring 14' and brush 15' to alternating current main 1b'', the circuit to direct current main 6 being open since brushes 12' are engaging the insulation on the adjacent disk 11'; and (c) the circuit in direct current mains 6, 7, is open through brushes 12'', 13'', since the latter are engaging the insulation on the adjacent disk 11''.

In Fig. 6, (a) current in alternating current main 1a'' is flowing therefrom through brush 15, ring 14, segments 10, brushes 12 and leads 12a to direct current main 6, the circuit from direct current main 7 being open since brushes 13 are engaging the insulation on the adjacent disk 11; (b) a portion of the current in direct current main 7 is flowing therefrom through leads 13a', brushes 13', segments 10', ring 14' and brush 15' to alternating current main 1b'', the circuit in direct current main 6 being open since brushes 12' are engaging the insulation on the adjacent disk 11'; and (c) a portion of the current in direct current main 7 is flowing therefrom through leads 13a'', brushes 13'', segments 10'', ring 14'' and brush 15'' to alternating current main 1c'', the circuit in direct current main 6 being open since brushes 12" are engaging the insulation on the adjacent disk 11".

It will be understood that the shaft 5 is driven at such speed that it makes one half revolution for each complete cycle of the alternating current impressed on the leads 1, 2, 3, and while the views in the accompanying drawing illustrate and the foregoing description refers to the position of the sets of contacts for each alternating current supply lead 1a"—16, 1b"—16', 1c"—16", throughout one-half of a complete cycle, it will be understood that as the shaft 5 rotates to make one half revolution the respective pairs of contacts (segments) re-engage the sets of contacts (brushes) adjacent thereto, respectively, to complete the cycle so that a complete cycle is effected for each half revolution of the shaft.

It will be noted (a) that the segments on each disk are diametrically related and the brushes of each set are diametrically related for simultaneous engagement with the segments and all of the brushes related to each disk 11, 11', 11", are uniformly spaced a distance greater than the length of each segment, whereby each pair of segments alternately engage the adjacent sets of brushes and (b) that the segments 10' on the disk 11' are arranged in a different angular relation about the axis of the shaft 5 as compared to the segments 10 on the disk 11 and that the segments 10" on the disk 11" are arranged in a different angular relation about the axis of the shaft 5 as compared to the segments 10' on the disk 11'; accordingly, as the shaft 5 rotates, (a) the pairs of segments on the disks 11, 11', 11" are simultaneously moved into engagement with those sets of brushes which are connected to the direct current mains having the same polarity as the current in the pairs of segments, respectively, and (b) due to the spacing of the brushes, each pair of segments in moving out of engagement with one set of brushes into engagement with the other set of brushes, is disengaged from both sets, such disengagement being effected when the phase angle of the current in the lead connected to said pair of segments is zero. It will thus be seen that while there is a reversal of the current in the alternating current mains, the current in the direct current mains is uni-directional at all times. Accordingly, the molecular structure of the welded seam will have a uniform texture and density throughout its length, as contradistinguished from a stitch weld.

It will also be noted that each disk 11, 11', 11" and the adjacent disk 14a may be formed integrally or as a unitary assembly.

It will also be understood that the alternating current mains 1, 2, 3, may be provided with a suitable switch to cut in the current; also a suitable switch may be provided in the leads 1a, 1b, 1c, leads 1a', 1b', 1c' and leads 1a", 1b", 1c", leads 16, 16', 16", and direct current mains 6, 7; these switches not being shown as they are of well known construction and one or more thereof may be provided as may be found desirable; likewise a device, such as a rheostat, may be provided to regulate the current to the electrodes 9, 9'.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In welding apparatus, the combination with a three-phase step-down transformer and alternating current supply mains connected to the primary windings thereof, of leads connected to the secondary windings of said transformer, rotatable electrodes adapted to engage the work, direct current mains connected to said electrodes, and current reversing means between each said lead and said direct current mains for connecting said lead alternately to said direct current mains during the reversal of current therein.

2. A welding apparatus as claimed in claim 1 wherein each said means consists of a set of contacts connected to the adjacent lead and sets of contacts connected to said direct current mains, respectively, and a current reversing device for effecting alternate engagement of said first mentioned set of contacts with said last mentioned sets of contacts.

3. In welding apparatus, the combination with a three-phase step-down transformer, a synchronous motor and alternating current supply mains connected to said motor and the primary windings of said transformer, of leads connected to the secondary windings of said transformer, a shaft connected to and driven by said motor, sets of segments carried by and insulated from said shaft, each set being connected to one of said leads, rotatable electrodes adapted to engage the work, direct current carrying mains connected to said electrodes, and sets of contacts for each set of segments arranged to be alternately engaged by the latter, and leads connecting each of the last mentioned sets of contacts with one of said direct current mains, said sets of segments being angularly related about the axis of said shaft to alternately connect each of said sets of segments to the adjacent sets of contacts during the reversal of current in the lead connected to said set of segments.

4. In welding apparatus, the combination with a three-phase step-down transformer, alternating current supply mains connected to the primary windings of said transformer, of leads connected to the secondary windings of said transformer, a shaft, means for driving said shaft, a conducting ring on the shaft for each of said leads, disks fixed to said shaft, one for each of said leads, diametrically related segments on each of said disks in insulated spaced relation and electrically connected to one of said leads and one of said conducting rings, a pair of rotatable electrodes adapted to engage the work, direct current carrying mains each connected to one of said electrodes, pairs of brushes related to each disk and arranged to be engaged by the segments thereon, the brushes of each pair being connected to one of said direct current mains and diametrically related, whereby the segments alternately engage said pairs of brushes and each brush being uniformly spaced from the brushes of the other pair of brushes, the adjacent brushes being so spaced relative to the length of the adjacent segments that when the current in the lead connected to said segments is at zero phase angle, the segments are out of engagement with all of said brushes, the segments on the respective disks having different angular relation whereby said segments engage said pairs of brushes in coordinated relation to the reversal of current in said leads.

5. In welding apparatus, the combination with a pair of rotatable electrodes arranged to engage with the stock to be welded and secondary multiple-phase alternating current supply leads, direct current leads connected to said electrodes, respectively, and relatively movable sets of contacts for each said alternating current lead and said direct current leads, certain of said contacts being electrically connected to each of said direct current leads, and the remaining set of contacts being continuously electrically connected to said alternating current leads, and means for causing alternate engagement of the contacts connected to each said alternating current lead with said adjacent contacts connected to said direct current leads.

6. In welding apparatus, the combination of a pair of rotatable electrodes adapted to engage the stock to be welded, direct current mains connected to said electrodes, secondary multiple-phase alternating current supply mains, and mechanical current rectifying means between said alternating current supply mains and said direct current mains for establishing a continuous direct current circuit through said electrodes and stock.

7. A welding apparatus as claimed in claim 6 wherein is provided between the alternating current supply mains and said rectifying means a transformer for stepping down the voltage.

HOWARD I. MORRIS.